Jan. 1, 1963    W. A. WINGET    3,070,938
GRASS MOWERS
Filed June 20, 1960    3 Sheets-Sheet 3
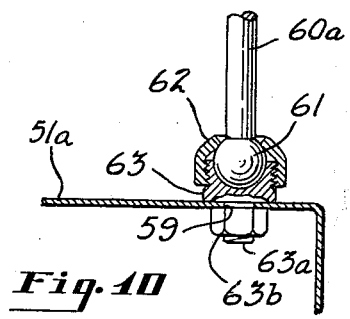
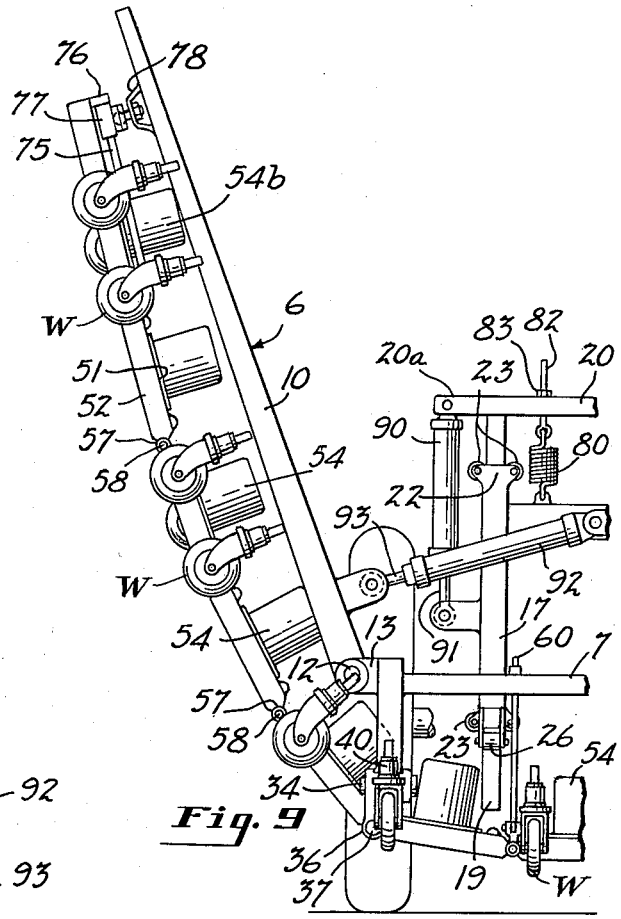
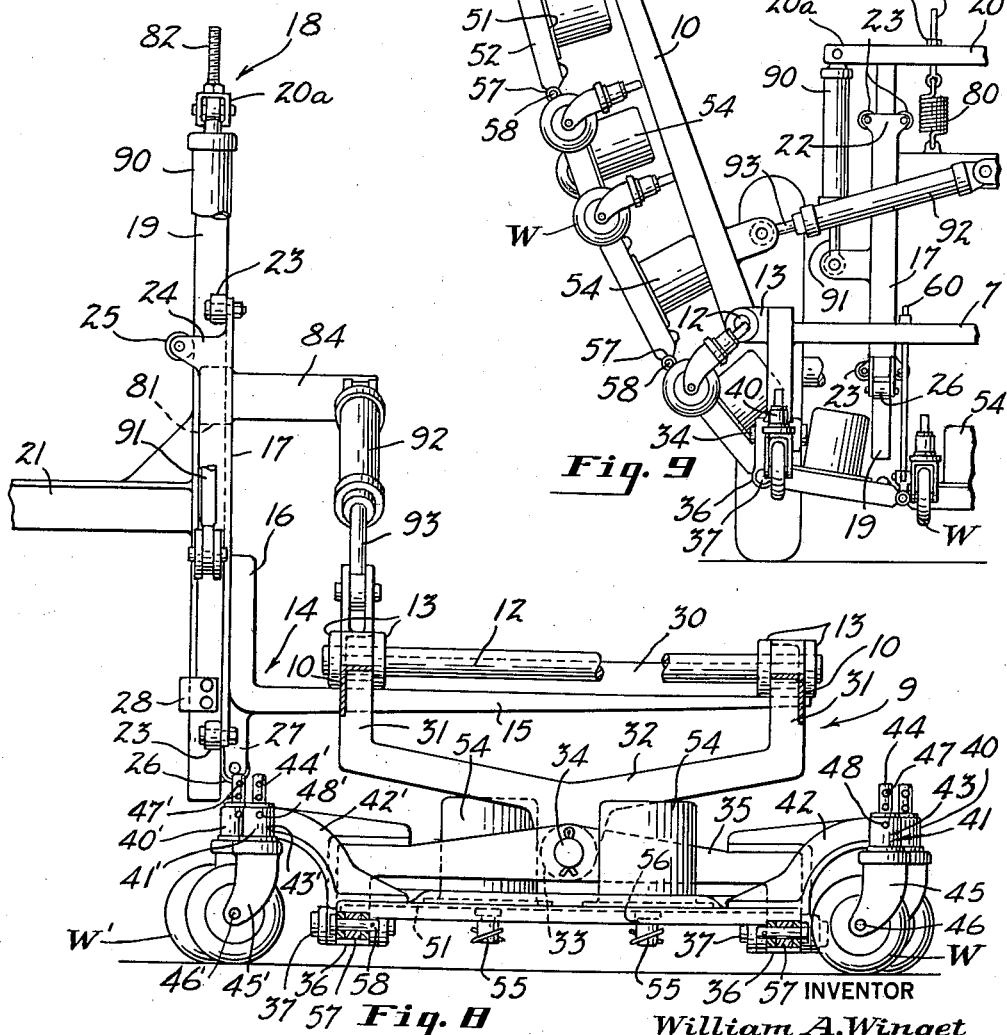
INVENTOR
William A. Winget
BY
ATTORNEYS

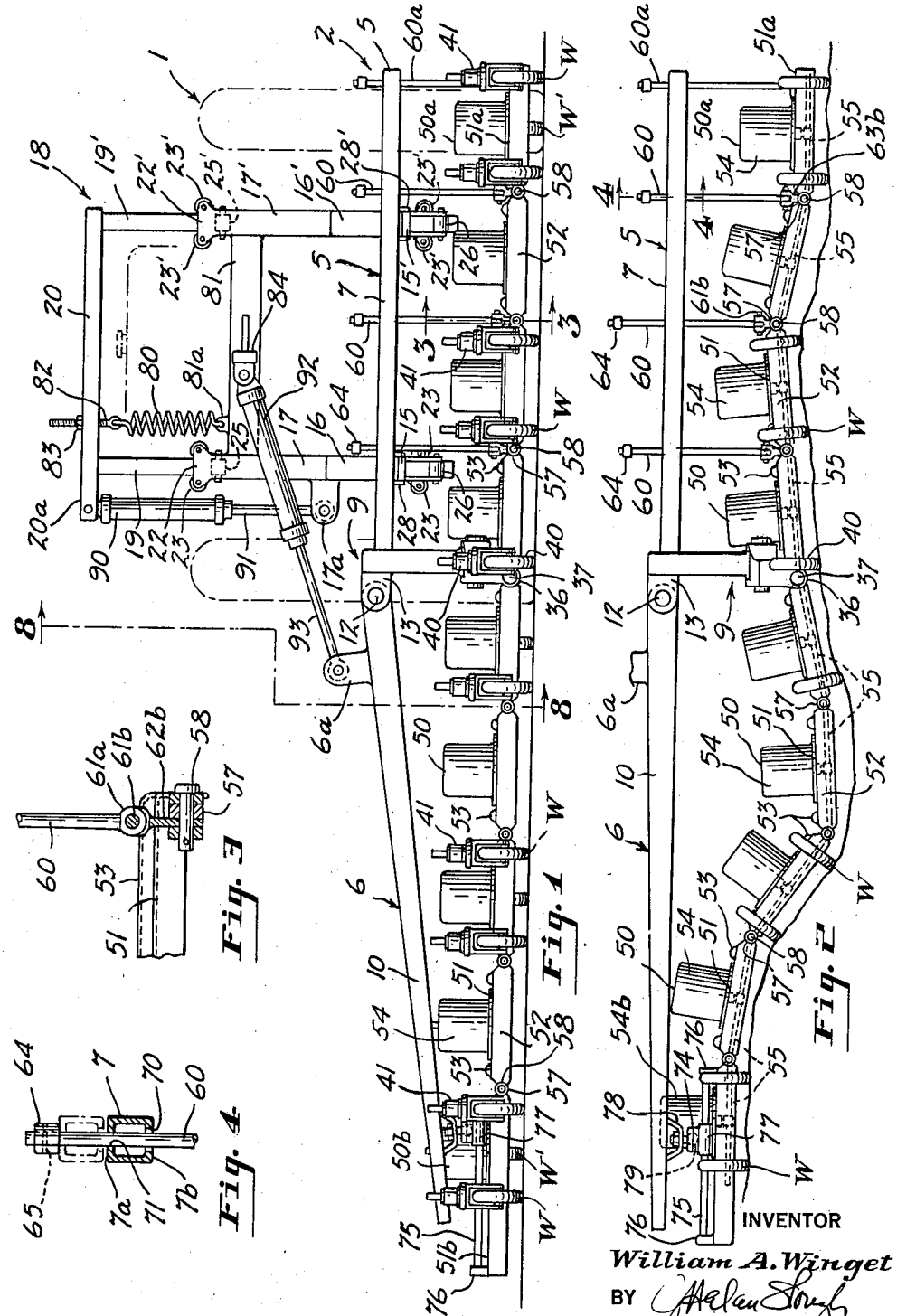

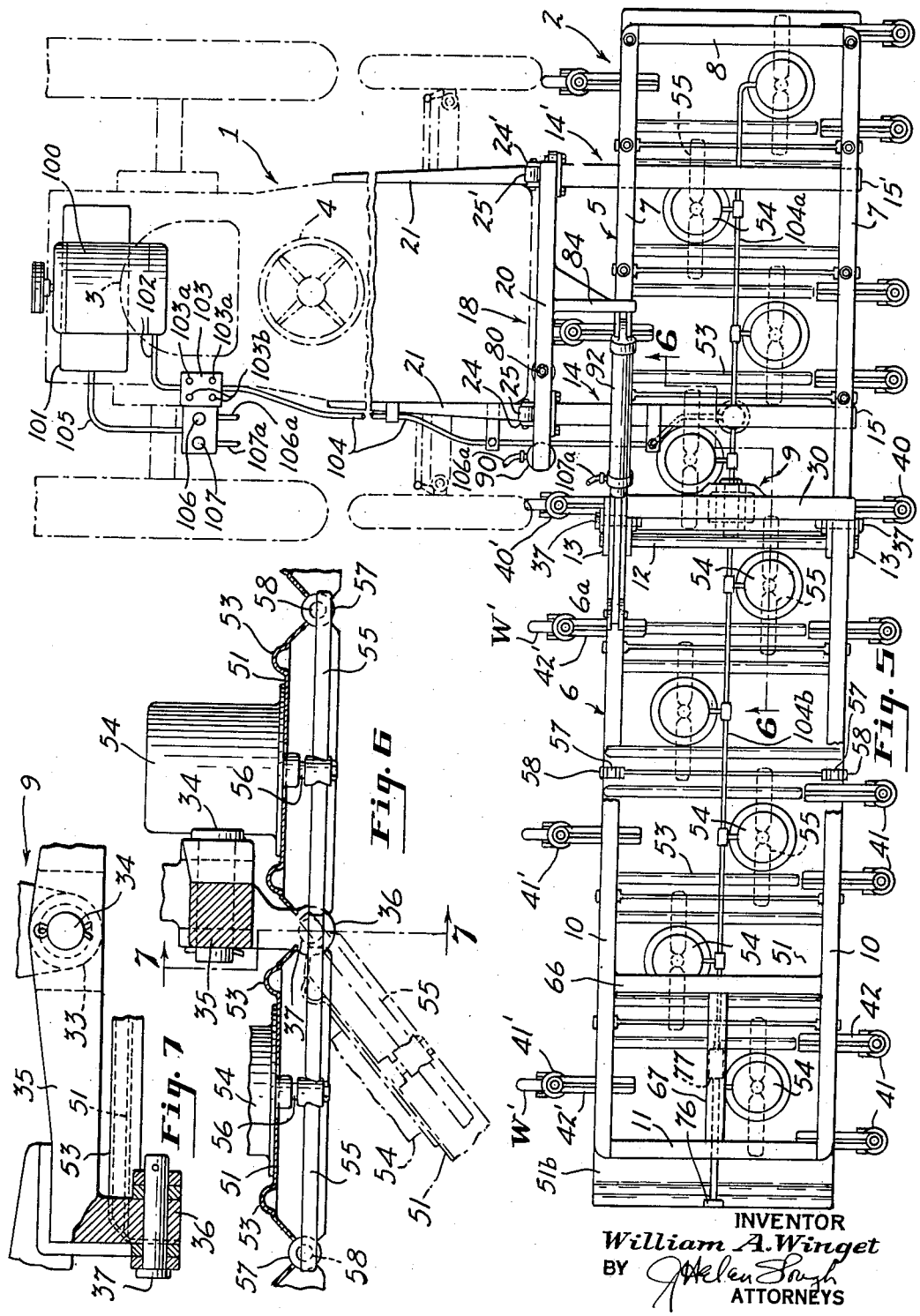

United States Patent Office 3,070,938
Patented Jan. 1, 1963

1

3,070,938
GRASS MOWERS
William A. Winget, Lima, Ohio, assignor of one-half to Shunk Manufacturing Company, Bucyrus, Ohio, a partnership
Filed June 20, 1960, Ser. No. 37,153
16 Claims. (Cl. 56—6)

This invention relates generally to grass mowers and relates more particularly to improvements in such mowers which comprise a plurality of interconnected individual mowers adapted to operate as a unit and to closely follow both the lateral and longitudinal irregularities of the ground surface over which it is traveling.

It is an object of this invention to provide a device of the above type suitable for attachment to the front or rear end of a tractor or other vehicular source of power.

Another object of this invention is to provide a device of the above type which may be adjusted to cut optionally either a relatively wide or a relatively narrow swath in the grass to be mowed.

Yet another object of this invention is to provide a mower having the above characteristics including means for elevating and deactivating a portion of the individual mower units while using the remaining mower units for grass cutting operations.

A further object of this invention is to provide such a device which includes means for elevating and deactivating all of the individual units when the tractor is to be driven along a highway or road.

Yet another object of this invention is to provide a mower of the above type which readily adapts for grass cutting operations in deep, road-side ditches and on steep banks.

A still further object of this invention is to provide an improved mower of the type referred to wherein the individual mower units have vertical flexibility relative to a single line of supporting contact of the mower with the ground and with respect to each other.

Yet another object of this invention is to provide a mower of the above type wherein each individual mower unit is laterally tiltable relative to the other individual mower units.

Further objects of this invention and the invention itself will be readily apparent from the following description and the accompanying drawings, in which said drawings:

FIG. 1 is a front elevation of the mower showing the tractor in broken lines;

FIG. 2 is a diagrammatic front elevation of the mower frames and associated individual mower units in a relatively different position from that of FIG. 1;

FIG. 3 is an enlarged sectional view taken along the line 3—3 of FIG. 1;

FIG. 4 is an enlarged sectional view taken along the line 4—4 of FIG. 2;

FIG. 5 is a top plan view of the mower showing the tractor in broken lines;

FIG. 6 is an enlarged sectional view taken along the line 6—6 of FIG. 5;

FIG. 7 is a detail in partial section taken generally along the line 7—7 of FIG. 6;

FIG. 8 is a sectional view taken generally along the line 8—8 of FIG. 1;

FIG. 9 is a partial front elevation of the mower showing all individual mower units in a raised position; and FIG. 10 is a view similar to FIG. 3 showing the lift rod mounted in a slightly modified way.

The modification of my invention as herein illustrated and described shows a mower adapted to be attached to the forward end of a tractor or the like vehicle whereby two gangs of laterally interhinged mower units

2 disposed in line with each other and preferably at right angles to the direction of movement of said tractor are propelled across the ground area to be mowed.

The front of the tractor is equipped with a pair of lift forks adapted for vertical movement, and a rectangular frame is secured flatwise across said forks for vertical movement therewith. A second rectangular frame is hingedly connected adjacent one end of the first mentioned frame and projects laterally outwardly to one side of the tractor. Adjacent the hinge there is provided a support, the upper part of which is secured to said first frame and the lower part of which is pivoted to said upper part for pivoting forwardly and rearwardly.

Two gangs of mowers are suspended, one beneath each of the said rectangular frames. One end of each mower gang is hinged to the lower part of the support, each gang projecting laterally therefrom beneath its respective frame. Means are provided for suspending said mowers from their respective frames at points spaced from said support, said means allowing relatively free vertical movement of the individual mower units with respect to their associated frames. Power means is provided for raising said forks and first mentioned frame, and separate power means is provided for pivoting or folding said second mentioned frame upwardly and toward the first frame. Rolling engagement with the ground is provided at the support and at certain of the individual mowers by means of leading and trailing casters.

Each mower unit comprises an individual electric power unit and a blade mounted to a separate frame, and each gang of mowers is supplied with current through a separate circuit. The entire mower may be operated in either a forward or rearward direction by the tractor, and the gang associated with the pivoted frame may be raised whereby that gang only which is associated with the first frame is used in the mowing operation. When it is desired to travel along a road or highway, both said frames and both gangs of mowers suspended therefrom may be raised, the first mentioned frame being raised vertically and the second mentioned frame pivoted or folded up and toward said first frame.

Referring now to the drawings, in all of which like parts are designated by like reference characters, and particularly to FIGS. 1, 2, and 5, at 1 there is indicated in broken lines a tractor adapted to support a gang-type mower generally indicated by the reference numeral 2. The tractor 1, as herein illustrated, is preferably of a conventional four wheel type providing a seat 3 for the operator immediately behind a steering wheel 4. It will be understood that the mower 2 is adaptable for use with any suitable land-type vehicle, and the tractor as herein shown is given as an example only.

The mower 2 comprises a main frame generally indicated at 5, secured immediately in front of the tractor 1 and at right angles to said tractor and a pivoted frame, generally indicated at 6, pivotally mounted to one of the laterally disposed ends of said main frame. As best seen in FIG. 5, the main frame 5 is generally rectangular in shape with its longest dimension directed at right angles to the longitudinal center line of the tractor. Said main frame comprises a pair of parallel, spaced beams 7 joined at one end thereof by a relatively shorter beam 8. The opposite ends of the beams 7 are unitarily joined by means of a universal-type main support 9, hereinafter to be more fully described.

The pivoted frame 6 is also rectangular in shape and is, in the form shown, somewhat longer than the main frame 5. Said pivoted frame comprises a pair of parallel spaced beams 10 joined at their outwardly directed ends by means of a relatively shorter beam 11. The inwardly directed ends of the beams 10 are each secured to a pivot shaft 12 which is pivotally mounted on the main support 9 by means of laterally projecting support members 13.

The main frame 5 is mounted on the front of the tractor in a horizontally fixed position whereby it remains level with the said tractor at all times. Said main frame is, however, vertically movable relative to the tractor by means of a pair of lift forks 14 and 14'. The lift forks 14—14' are parallel and laterally interspaced and project substantially horizontally in a forward direction from the tractor. Said forks are L-shaped and comprise relatively long, horizontally disposed legs 15—15' and upwardly directed, relatively shorter legs 16—16'. The shorter legs 16—16' are welded or otherwise suitably secured to a pair of vertically movable supports 17—17' which are vertically slidable relative to a fork support frame generally indicated at 18.

The fork support frame 18 as best seen in FIGS. 1, 8 and 9, is generally in the shape of an inverted U comprising a pair of substantially vertically upright guides 19—19' integrally joined at their uppermost ends by a cross beam 20. The guides 19—19' are rigidly and fixedly secured to the frame of the tractor by means of rearwardly directed brackets 21—21' which are disposed laterally on either side of the tractor. The brackets 21—21' are preferably welded to the guides 19—19' and are bolted, welded, or otherwise suitably secured to the frame of the tractor. The movable supports 17—17' are generally U-shaped in horizontal section and adapted to nestingly and slidably fit over the fixed guides 19—19'.

The movable supports 17 and 17' are provided at the extreme upper and lowermost ends thereof with generally triangularly shaped, laterally projecting roller mounts 22—22' which provide mounting means for pairs of rollers 23—23 and 23'—23'. Each pair of rollers 23—23 is so disposed that one of said rollers contacts one side of the guide 19 and the other said roller contacts the other side of said guide. The pairs of rollers 23'—23' are similarly disposed with one roller of each pair being in rolling engagement with one side of the guides 19' and the other roller of each pair being in rolling contact with the other side of said guide 19'.

By referring particularly to FIGS. 1 and 9, it will be readily seen that the rollers 23—23 and 23'—23' provide relatively frictionless engagement from a lateral direction between the movable supports 17—17' and the fixed guides 19—19' and that said rollers effectively prevent binding of the movable to the fixed members which might result from a shifting of the main frame 5 which is supported by the legs 15—15' of the forks 14—14'.

Referring now specifically to FIG. 8, it will be noted that the weight of the main frame 5 upon the lift forks 14—14' will cause the upper ends of the movable support 17—17' to tend to pivot away from the guides 19—19' in a forward direction and that the lowermost ends of said movable support will tend to pivot inwardly toward said guides. To maintain the movable support 17—17' in nesting engagement with the guides 19—19' and to provide a smooth, relatively frictionless contact between the two members, the uppermost ends of said movable supports are provided with pairs of rearwardly projecting ears 24—24 and 24'—24' which project rearwardly beyond the guides 19—19' and provide journal means for axially laterally disposed rollers 25—25'. Said rollers 25—25' contact the rearwardly disposed surfaces respectively of the guides 19—19' whereby the upper ends of the movable supports 17—17' are prevented from pivoting away from said guides.

Similarly, rollers 26—26' are provided adjacent the lowermost ends of the movable supports 17—17', said rollers 26—26' being journaled between pairs of arms 27—27' which are integral with and project downwardly from the lower surface of the lift forks 14—14' respectively. The rollers 26—26' are in rolling engagement with the forwardly directed surfaces of the guides 19—19', and in cooperation with the upper rollers 25—25' effectively prevent binding in a forward and rearward direction between the movable supports 17—17' and said guides.

Adjacent the lower ends of said movable supports there are provided rearwardly projecting, angled retainers 28—28' which are adapted to hook loosely over the rearwardly directed surfaces of the upright guides 19—19'. The purpose of these retainers is to prevent the lower ends of the movable supports 17—17' from moving outwardly from the guides 19—19' in the event that a sudden upward thrust is effected against the lift forks 14—14'. However, it will be understood that the retainers 28—28' under ordinary circumstances do not engage the guides 19—19' and that there is ordinarily no need for such engagement.

The ground engaging weight of the frames 5 and 6 is carried primarily through the universal-type main support 9. Referring now to FIG. 8, the main support 9 comprises a cross member 30 to which the ends of the beams 7 of the main frame 5 are secured on one side thereof and to which the support members 13 for the pivot shaft 12 are secured on the other side thereof. The forward and rearward ends of the cross-member 30 are provided with depending arms 31 joined at their lowermost ends by a slightly V-shaped member 32. The central portion of the V-shaped member 32 has an integrally formed, downwardly projecting bearing 33 adapted to receive a shaft 34. The shaft 34 is axially parallel with the lengthwise dimension of the frames 5 and 6 and is disposed at right angles to the center line of the tractor 1. A heavy yoke 35 is centrally pivoted upon the shaft 34, said yoke 35 being parallel with the cross-member 30 and having slightly downwardly projecting, integrally formed bearings 36 at either end thereof. The bearings 36 are axially aligned and the axes thereof are parallel with the yoke 35 and the center line of the tractor 1.

The forward end of the yoke 35 has securely mounted thereto a leading caster 40, and the rearwardly directed end of said yoke is similarly provided with a trailing caster generally indicated at 40'. As the tractor and the mower 2 move forwardly across the ground, the casters 40 and 40' are enabled to individually follow the longitudinal contour of the ground in the direction of movement due to the pivoting action of the yoke 35 about the shaft 34 of the bearing 33.

Beneath the frames 5 and 6 and extending in either lateral direction away from the main support 9, there are provided a plurality of interhinged, individual mower units 50. Each mower unit comprises a rectangular, plate-like frame 51 having depending flanges 52 at the forward and rearward edges thereof and longitudinally disposed, upwardly formed ribs 53 adjacent either lateral edge of said frame. The power source for each mower unit comprises an electric motor 54 mounted upon the top surface of the frame 51 adapted to drive a rotary cutting blade 55 mounted on a drive shaft 56 of said motor and being disposed beneath said frame 51. As best seen in FIG. 5, the lateral edges of the frame 51 at the forward and rearward portions thereof are provided with hinge bearings 57 substantially centrally located in a line with the cutting blades, adapted to receive hinge pins 58. This preferred positioning of the hinge point between adjacent mower units permits the rotary cutting blades associated with the various mower units to function within extremely close limits up to fractions of an inch, without danger of overlap or contact between adjacent positioned blades. The two mower units positioned immediately upon either side of the main support 9 are hingedly connected to the bearings 36 of the yoke 35 by means of hinge pins 37.

Referring now to FIG. 2, it will be noted that by the hinged arrangement of the mowers as above described, each gang of mowers on either side of the main support 9 is vertically flexible whereby it can follow the contour of the ground regardless of how irregular it may be. Said mowers are also forwardly and rearwardly tiltable due to the tilting action of the yoke 35. In this way, the mower 2 is enabled to follow the irregularities of the ground surface as the tractor moves along regardless of whether such irregularities are in a longitudinal or a lateral direction.

Referring now particularly to FIG. 5, certain of the individual mower units are preferably provided with leading casters 41 and trailing casters 41'. Every mower unit is not provided with casters, since, obviously, a mower unit which is hingedly suspended between two similar units having caster wheels will be adequately suspended above the ground and will have no need of caster wheels itself.

As herein illustrated, the main frame 5 has positioned therebeneath four individual mower units whereas the pivoted frame 6 has positioned therebeneath five such units. The number of individual mower units could vary and the numbers given here are intended as examples only. The outer mower units in either lateral direction relative to the main support 9 are provided with two leading casters 41 and one trailing caster 41'. The third mower unit inwardly from either end is similarly provided with two leading casters 41 and one trailing caster 41'. The mower unit which is attached immediately to the main support 9 and positioned under the pivoted frame 6 is provided with one leading caster 41 and one trailing caster 41'. This arrangement of casters could, of course, be varied such as by providing each mower unit with one leading and one trailing caster or by placing pairs of leading casters on each mower unit in combination with single or double casters.

The casters 40—40' and 41—41' are substantially identical in construction with the exception that the former are mounted on the yoke 35 and the latter are secured in a similar fashion to the frames 51 of the individual mower units 50. Therefore, only the casters 41—41' will be described in detail, it being understood that casters 40—40' are similarly constructed in every respect.

Referring now to FIG. 8, the casters 41—41' comprise mounting brackets 42—42' which are secured respectively to the forward and rearward ends of a frame 51 of a mower and project forwardly and rearwardly therefrom. The forward end of the bracket 42 terminates in an axially vertically disposed bearing 43 integrally formed with said bracket, and the bracket 42' is similarly provided at the rearwardly directed end thereof with a vertically disposed bearing 43'. The caster wheel supports are conventional in design comprising upwardly directed, swivel shafts 44—44' and downwardly directed, laterally curved forked wheel supports 45—45'. The wheels W—W' are pivotally mounted between the forked wheel supports 45—45' by means of axles 46—46'. It will be understood that due to the fact that the horizontal axles 46—46' are laterally offset relative to the axis of the vertical swivel shafts 44—44', the casters will individually tend to align themselves whereby the wheels W—W' always run parallel with the direction of movement of the structure which they support.

It will be noted that the swivel shafts 44—44' are provided wtih a plurality of axially evenly interspaced apertures 47—47' which are adapted to receive pins 48—48' which project through suitable apertures in the bearings 43—43'. By means of the said pins and apertures, the individual mower units can be raised or lowered relative to the ground line thereby varying the height of the cut made by the rotating blades 55 of the electric motors 54. In making such adjustments, all of the casters 40—40' and 41—41' would preferably be individually adjusted whereby every mowing unit would be cutting at the same height. However, the mowing units at one portion of the mower 2 can be set at a different height from the other individual mowing units if so desired without interfering with the operation of the mechanism.

The individual mowing units which are positioned beneath the main frame 5 are limited in their downward movements by means of a plurality of lift rods 60. The lift rods 60 are secured at their lowermost ends to the hinge bearings 57 between each pair of mowers and project upwardly through suitable apertures in the longitudinal beams 7, the uppermost ends of said lift rods being provided with stop member to limit the downward movement thereof.

As best seen in FIG. 3, the lowermost ends of each lift rod 60 is provided with an enlarged end in the form of a bearing 61a through which a pin 61b extends, said pin also extending through ears of a short link 62b which in turn is secured to the hingle bearing 57 by pin 58. The pin 61b and pin 58 have their horizontal axes at right angles to each other and together with link 62b and the rod 60, provide a support for the hinge bearing 57 while allowing free tilting movement of the frames 51.

In the gang of mowers associated with the main frame 5, the individual mowing unit 50a which is positioned furthest from the main support 9 is provided with a lift rod 60a which is substantially similar to the lift rod 60. As shown in FIG. 10, the lift rod 60a is provided with a ball 61 and a socket housing 62—63. In the case of the mower unit 50a the lower housing portion 63 is mounted directly to the mower frame 51a. The threaded shank 63a of said lower housing portion projects through a suitable aperture 59 in the frame 51a and is provided at the lowermost end thereof with a securing nut 63b.

The lift rods 60 and 60a are mounted to both the forward and rearward ends of the individual mower units whereby they project upwardly through both of the beams 7 of the main frame 5. In FIG. 4 is shown the uppermost end of one of the said lift rods and it will be understood that all of said lift rods are slidably mounted through the beams 7 in substantially the same manner.

The beams 7 are preferably box-shaped in section thereby providing a pair of vertically interspaced, horizontally disposed wall portions, an upper wall 7a and a lower wall 7b. A lift rod 60 projects upwardly through a relatively large opening 70 in the lowermost wall 7b and through a relatively smaller aperture 71 in the uppermost wall 7a.

The relatively larger dimension of the opening 70 in the lower wall 7b allows the lift rod 60 to tilt away from the vertical, such tilting action being a necessary consequence of the flexing of the mower gang. As the lateral contour of the ground varies, and as the hinged, individual mower units conform thereto, the effective lateral length of the entire gang of mowers will, of course, be constantly changing. As measured from the main support 9 and proceeding laterally outwardly therefrom, the gang of hinged mowers will be longest when said mowers are riding across level ground and will become progressively shorter as the ground becomes progressively more uneven. This characteristic of the hinged mower units causes slight lateral shifting of the lower pivot points of the lift rods at the ball 61 whereby said lift rods shift slightly off the vertical when the mower is traveling over uneven ground.

Adjacent the extreme uppermost end of the lift rods 60 there is provided a sleeve-like stop member 64 which is telescoped over the upper end of the lift rod and secured thereto in any suitable manner such as by a cotter pin 65. When the individual mower units 50 and 50a associated with the main frame 5 move downwardly to a certain point, or when the said main frame moves upwardly a limited distance, the stop member 64 abuts the uppermost surface of the wall 7a and maintains the individual mower unit at one level. The purpose of the lift rods 60 and 60a and their associated stop members 64 will be herein later more fully described.

In the gang of mowing units 50 which extend outwardly from the main support 9 beneath the pivoted frame 6, it will be noted that the outermost mower designated 50b is slightly modified relative to the other said mowers. The mower 50b (FIGS. 1, 2 and 9) is provided with an enlarged frame 51b which is substantially wider as seen from the front of the mower than the other frames 51 and 51a. A rod 75 is mounted upon the frame 51b by means of a pair of upwardly directed supports 76, said supports being secured in any suitable manner adjacent the lateral edges of said frame intermediate the forward and rearward ends thereof. The rod 75 is positioned slightly above the upper surface of the frame 51b and is secured at either end thereof by means of said upwardly directed supports 76. A slide member 77 is telescoped over the rod 75 and is adapted for movement within the limits of the two supports 76 which serve as stop members for said slide.

The pivoted frame 6 is provided with an additional short beam 66 which is parallel to and spaced inwardly from the short, end-beam 11 (FIG. 5). The beam 66 is welded or otherwise secured at its ends to the long beams 10, and the beams 11 and 66 are similarly interconnected by a member 67 which is parallel to the long beams 10, and is positioned centrally between said long beams.

The rod 75 is positioned directly beneath and parallel to the member 67, and the axis of said rod is aligned in a forward and rearward direction with the shaft 34 of the main support 9 as best seen in FIG. 5. The member 67 is provided with a U-shaped brace 78 having secured thereto a downwardly projecting ball 79. The ball 79 is seated within a socket portion 74 which projects upwardly from the slide member 77. The ball and socket 79—74 arrangements allow a free universal pivotal movement between the pivoted frame 6 and the outermost motor unit 50b whereby the said unit can tilt laterally or forwardly and rearwardly to conform to the lateral and longitudinal irregularities of the ground.

As the gang of mower units which is associated with the pivoted frame 6 effectively lengthens and shortens as the contour of the ground changes, the slide member 77 shifts along the rod 75 to accommodate such changes in length. For example, in the showing of FIG. 1, the mower units in the left hand gang are on level ground and therefore extend laterally outwardly to their furthest point. In this position the slide member 77 is positioned adjacent the right hand support 76 and most of said rod projects laterally outwardly beyond said slide member. When the gang of mowers is distributed over laterally uneven ground as shown in FIG. 2, the effective length of the gang of mowers is shortened and the slide member 77 is positioned adjacent the central portions of the rods 75.

The upwardly formed ribs 53 serve to strengthen the frames 51.

Referring now to FIG. 5, it will be further noted that the positioning of the motors 54 and their blades 55 relative to the individual mower units is staggered, alternate mower units having the motors thereof positioned forwardly with the mower units in-between having the motors thereof positioned rearwardly. The blades 55 are of such length that the cutting path of one of said blades overlaps the cutting path of the blade of the particular mower unit which is next to it. Blades of such increased size are possible due to the forward and rearward staggering of the electric motors 54 and such overlapping of the cutting paths eliminates the possibility of the mower 2 leaving ridges of uncut grass behind it.

As hereinbefore stated, the ground engaging or effective weight of the main frame 5 and the pivoted frame 6 is carried by the casters 40—40' of the main support 9. However, the actual weight of said frame is preferably less than the effective weight which presses against the ground, the actual weight being partially offset by means of a counterbalance spring 80, as best shown in FIG. 1.

The spring 80 is secured at the lowermost end thereof to a web 81 which extends horizontally between and is secured at either end to the movable supports 17 and 17'.

The web 81 is provided with an upwardly projecting eye 81a into which the lowermost end of the spring 80 is hooked. The upper end of said spring 80 is secured by means of an adjustable eye bolt 82 to the cross beam 20 which horizontally connects the uppermost ends of the guides 19—19'.

The eye bolt 82 is provided with an adjusting nut 83 by which the tension of the spring 80 may be varied to counter-balance the weight of the frames 5 and 6 to the desired degree. In this way the casters 40—40' and the main support 9 are protected against overloading which might cause the wheels W—W' of the casters 40—40' to sink into the ground due to the excessive pressure exerted thereon.

In ordinary operation, therefore, the tractor 1 propels the mower 2 across the ground with each of the mower units being operated individually by its respective electric motor 54. The main frame 5 is in a lowered position whereby the weight thereof, effectively counterbalanced by the spring 80, rests upon the forward and rearward casters 40 and 40'. The pivoted frame 6 is in a relaxed condition whereby it may pivot upwardly or downwardly as the outboard mower unit 50b moves up and down across the terrain. All of the other mowers, due to their interhinged relationship, automatically conform to the lateral shape of the ground, intermittently changing their effective length very slightly as the ground line changes and thereby effectively and efficiently mowing a relatively wide path of the grass. It will be readily seen that this mower is particularly effective for mowing the bottoms of roadside drainage ditches or for steeply banked areas. The pivoted frame 6 is capable of pivoting upwardly to any desired angle whereby extremely difficult, steep areas may be effectively mowed, and the mower gang associated therewith can flex or bow downwardly to accommodate to sharp depressions in the ground.

To effect the raising and lowering of the main frame 5 and its associated mowing units there is provided a lift cylinder 90. The lift cylinder 90 is secured at the uppermost end thereof to a laterally outwardly projecting end portion 20a of the cross beam 20 and is provided with a downwardly directed piston rod 91 secured at its lowermost end to a laterally projecting arm 17a of the movable support 17. By means of the lift cylinder 90, the movable support 17 and the support 17' connected thereto through the web 81 are raised or lowered. The lift forks 14—14' are thereby also raised or lowered and consequently the main frame 5 is similarly vertically moved.

The pivoted frame 6 is pivotally raised by means of a pivot cylinder 92 which is secured at one end thereof to a forwardly projecting brace 84 mounted to the web 81. The pivot cylinder 92 has a longitudinally movable piston rod 93 which projects laterally and slightly downwardly and is pivotally connected to an upstanding pair of arms 6a which project upwardly from the rearwardly disposed beam 10 of the pivoted frame 6. The arms 6a are spaced laterally a short distance from the pivot shaft 12 upon which the frame 6 pivots. By contracting the cylinder 92, the frame 6 may be pivoted upwardly and toward the main frame 5 as illustrated in FIG. 9.

The cylinders 90 and 92 are conventional single acting cylinders adapted to raise their respective frames when hydraulic pressure is applied thereto to pull the respective piston rods 91 and 93 inwardly. When the hydraulic pressure is released, the fluid which is exhausted from the cylinder is so metered out as to allow the respective frames to settle gently to the ground.

Referring now to FIG. 5, the tractor 1 is provided with a generator as indicated at 100 and a suitable hydraulic power source as indicated at 101. These two units may be of conventional design and are not herein illustrated in detail. It is to be assumed that power for running the generator 100 and the hydraulic power unit 101 could be taken from the tractor motor itself or be provided by a separate, small gasoline engine or the like.

Current from the generator 100 passes through suitable electrical conduits as indicated at 102 to a control panel 103 located on the right side and within reach of a driver seated upon the seat 3. Line 104 connects the control panel 103 with the mower units, said line 104 branching into and comprising two electrical circuits 104a and 104b. The circuit 104a provides electrical current to the four individual mower units 50 which are connected to and positioned beneath the main frame 5. The circuit 104b provides electrical current to the five individual mower units which are connected to and positioned beneath the pivot frame 6.

The control panel 103 is provided with two pairs of on and off control buttons 103a—103a and 103b—103b. The control buttons 103a—103a are adapted to make or break the circuit 104a leading to the mower units associated with the main frame 5; the control buttons 103b—103b are adapted to make and break the circuit 104b leading to the mower units associated with the pivoted frame 6. It will be readily seen, therefore, that each gang of mowers is individually actuable and may be operated separately or in unison.

Fluid from the hydraulic power source 101 is directed through a suitable tube 105 to a pair of valve control means 106 and 107. By means of the valve control means 106 fluid is delivered through a hydraulic line 106a to the lift cylinder 90 for raising the main frame 5. Similarly, by means of the valve 107 fluid is delivered to the pivot cylinder 92 through a line 107a to cause the frame 6 to pivot upwardly.

The present mower 2 may be used in either of two ways. If a particularly wide area is to be cut, the mower is used in the ordinary way hereinbefore described with the pivoted frame 6 in its downward position and with both gangs of mowers running. If, however, it is desired to mow a relatively narrow path, the pivoted frame 6 is raised to the position as shown in FIG. 9 with, however, the main frame 5 is being left in a lowered position as shown in FIG. 1. The gang of mowers associated with the pivoted frame 6 are turned off by means of the "off" control of the switch 103b and only that gang of mowers associated with the main frame 5 is used for cutting. Thus, the mower 2 is readily adaptable for cutting both wide and relatively narrow strips of grass.

When it is desired to move the entire mower 2 from one work area to another, said mower is adjusted to the position shown in FIG. 9, whereby both the pivot cylinder 92 and the lift cylinder 90 are actuated. This pivots the frame 6 upwardly to the position shown in FIG. 9 and raises the main frame 5 whereby, by means of the lift rods 60 and 60a, those mower units associated with said main frame are raised a substantial distance off of the ground. With both frames and their associated mowers in the raised position, the tractor may be driven along a highway in the normal manner of road type vehicles.

The lateral positioning of the lift cylinder 90 is such that the frames 5 and 6 and their associated parts are substantially evenly distributed in their weight on either side of the center line of said cylinder. Also, the counterbalance spring 80 is preferably closely adjacent to the point of balance between the frames when both frames are lowered and in the normal running position.

By referring to FIG. 9, it will be noted that when the frame 6 is in the raised position, the slide member 77 is moved laterally outwardly along the rod 75 until it abuts the outermost support 76. The outermost support 76 is so positioned relative to the point where the innermost mower is pivoted to the main support 9 as to cause the intervening hinged mowers to be sufficiently tensioned to prevent undue sag therein when the pivoted frame 6 is raised to its uppermost position. This prevents undue swaying of the mowers with the consequent possibility of damaging the same.

It is anticipated that the pivoted frame 6 could project laterally from either side of the tractor, be angled with respect thereto, etc. but it is preferable that it project, as herein illustrated, to the right of the tractor whereby it would provide no obstacle to oncoming traffic when traveling along the highway in the adjusted position of FIG. 9.

It is also to be understood that variations in the modification disclosed could be made, as for example, an adaptation to a relatively small mower construction, wherein only a few mower units having the vertical flexibility and forward and rearward tilting of the present invention would be employed.

It will also be understood that many departures from the details of this invention as herein described and illustrated may be made without, however, departing from the spirit thereof or the scope of the appended claims.

What I claim is:

1. A grass mower for attaching to a vehicle comprising a plurality of individual mower units, each of said units having its own source of power and a blade actuable by said source of power, means hingedly securing said units to said vehicle and each other, said hinge means being in the plane of the rotary cutting blades, means associated with said units and said vehicle adapted to vertically displace and longitudinally tilt said units with respect to the ground and in relation to said vehicle.

2. A grass mower for attaching to a moving vehicle comprising at least two individual mower units, a support vertically movably mounted on said vehicle, wheel means carried by said support whereby said support is in rolling contact with the ground, said support being forwardly and rearwardly flexible in the direction of movement of said vehicle, each said individual mower unit hingedly connected along one lateral side thereof to said support, one of said units being positioned on one side of said support and the other said unit being positioned on the other side of said support, and additional wheel means mounted on said individual mower units for rolling contact with the ground.

3. A grass mower as set forth in claim 2, comprising lift means associated with said vehicle and with said individual mower units for separately lifting said units off of the ground.

4. A gang-type grass mower attached to a vehicle comprising a horizontally disposed, vertically movable frame mounted on said vehicle, a support mounted on one end of said frame having ground engaging wheel means, said frame angularly disposed relative to the direction of movement of said vehicle, a mower gang pivoted at one end to said support and extending therefrom beneath said frame, said gang comprising a plurality of laterally interhinged mowing units, said units having wheel means for rolling contact with the ground, lift means connecting said gang with said frame, said gang being vertically flexible to conform to the lateral contour of the ground, and power means associated with said vehicle and said frame for lifting said frame to raise said gang above the ground.

5. A gang-type grass mower attached to a vehicle comprising a vertically movable support, means for vertically movably mounting said support to said vehicle, said support having ground engaging wheel means, a frame pivoted at one end to said support to pivot upwardly, said frame disposed angularly to the direction of movement of said vehicle, a mower gang pivoted at one end thereof to said support and positioned beneath said frame, the axis of the pivot of said mower gang being parallel to the pivotal axis of said frame, said gang comprising a plurality of laterally interhinged mowing units, said gang having wheel means for rolling contact with the ground, lift means connecting said gang with said frame, said gang being vertically flexible to conform to the lateral contour of the ground, and power means associated with said vehicle and said frame for pivoting said frame upwardly.

6. A gang-type grass mower attached to a vehicle comprising a support mounted to said vehicle, said support having ground engaging wheel means, a frame pivoted at one end to said support to pivot upwardly therefrom, said frame disposed angularly to the direction of movement of said vehicle, a mower gang pivoted at one end thereof to said support and positioned beneath said frame, the axis of the pivot of said mower gang being parallel to the pivotal axis of said frame, said gang comprising a plurality of laterally interhinged mowing units, said gang having wheel means for rolling contact with the ground, slidable connection means connecting a mowing unit of said gang which is disposed outermost from said support to said frame whereby said outermost mowing unit is movable toward and away from said support, said slidable connection having stop means limiting the movement of said outermost mowing unit.

7. A gang-type grass mower as set forth in claim 6 whereby the recited slidable connection means comprises a slide member slidably mounted to said outermost mowing unit and universal pivot means connecting said slide member to said frame whereby said outermost mowing unit is tiltable in both a lateral and a forward and rearward direction.

8. A gang-type grass mower attached to a vehicle comprising a horizontally disposed, vertically movable frame mounted to said vehicle, a support mounted to one end of said frame having ground engaging wheel means, a second frame pivoted to said support and aligned with said first frame, said frames disposed angularly to the direction of movement of said vehicle, a pair of mower gangs each pivoted at one end thereof to said support and extending laterally outwardly therefrom beneath one of said frames, each gang comprising a plurality of laterally interhinged mowing units, each said gang having wheel means for rolling engagement with the ground, means connecting each said gang with its respective frame, each said gang being vertically flexible to conform to the lateral contour of the ground, and power means associated with said vehicle and said frames including means for pivoting said second frame upwardly towards said first mentioned frame and means for lifting said first mentioned frame.

9. A gang-type grass mower for attaching to one end of a vehicle comprising a vertically movable, lift-fork mechanism mounted to said vehicle, a first frame secured horizontally across said lift-fork mechanism, a support mounted to one end of said first frame having means associated therewith for rolling engagement with a ground surface, a second frame pivoted to said support and aligned with said first frame, said frames disposed at right angles to the direction of movement of said vehicle, a pair of mower gangs each pivoted at one end thereof to said support and extending laterally outwardly therefrom beneath one of said frames, each said gang comprising a plurality of laterally interhinged, individual mower units, each said gang having wheel means for rolling engagement with said ground surface, means connecting each said gang with its respective frame, each gang being vertically flexibly movable to conform to the lateral contour of said ground surface, power means for pivoting said second frame whereby it folds upwardly toward said first frame, said first frame vertically movable by said lift-fork mechanism.

10. A gang-type grass mower vertically movably mounted to a vehicle comprising a lift mechanism, a frame horizontally secured to said lift mechanism, said frame being longitudinally disposed at right angles to the direction of travel of said vehicle, a support mounted to one end of said frame, said support comprising an upper and a lower portion, said upper portion being rigidly fixed to said frame, said lower portion being pivoted to said upper portion about an axis parallel with said frame, a second frame pivoted to said upper portion of said support and directed oppositely from said first mentioned frame, a pair of mower gangs each pivoted at one end thereof to said lower portion of said support about an axis parallel to the direction of movement of said vehicle and extending laterally outwardly therefrom beneath one of said frames, each said gang comprising a plurality of laterally interhinged mowing units, each said gang having wheel means for rolling engagement with the ground, lift means connecting each said gang with its respective frame, each said gang being vertically flexible to conform to the lateral contour of the ground, and power means associated with said vehicle and said frames including means for pivoting said second frame upwardly toward said first mentioned frame and means for lifting said first mentioned frame.

11. A gang-type grass mower vertically movably mounted to a vehicle comprising a lift mechanism, a frame horizontally secured to said lift mechanism, said frame being longitudinally disposed at right angles to the direction of travel of said vehicle, a support mounted to one end of said frame having ground engaging wheel means, a second frame pivoted to said support and directed oppositely from said first frame, a first gang of mowers hinged at one end to said support and extending beneath said first frame and a second gang of mowers hinged at one end to said support and extending beneath said second frame, each said gang comprising a plurality of laterally interhinged mowing units, each said gang having wheels means for rolling engagement with the ground, a plurality of lift rods pivotally secured to said first gang, said lift rods projecting upwardly through and slidably mounted on said first frame, said lift rods having stop means limiting the downward movements thereof, the outermost mowing unit of said second gang being secured to said second frame adjacent the outermost end of said second frame by a slidable connection means, said connection means providing for slidable and pivotable movement of said outermost mowing unit relative to said second frame, each said gang being vertically flexible to conform to the contour of the ground, and power means associated with said vehicle and said frames including means for pivoting said second frame upwardly toward said first mentioned frame and means actuating said lift mechanism to raise said first frame whereby all of said individual mowing units are raised above the ground.

12. A gang-type grass mower vertically movably mounted to a vehicle comprising a lift mechanism, a frame horizontally secured to said lift mechanism, said frame being longitudinally disposed at right angles to the direction of travel of said vehicle, a support mounted to one end of said frame, said support comprising an upper and a lower portion, said upper portion being rigidly fixed to said frame, said lower portion being pivoted to said upper portion about an axis parallel with said frame, a second frame pivoted to said upper portion of said support and directed oppositely from said first mentioned frame, a first gang of mowers hinged at one end to said lower portion of said support and extending beneath said first frame and a second gang of mowers hinged at one end to said lower support and extending beneath said second frame, each said gang comprising a plurality of laterally interhinged mowing units, each gang having wheel means for rolling engagement with the ground, a plurality of lift rods pivotally secured to said first gang, said lift rods projecting upwardly and slidably mounted to said first frame, said lift rods having stop means limiting the downward movements thereof, an outermost mowing unit of said second gang being secured to said second frame adjacent an outermost end of said second frame by slide means, said slide means slidably mounted to said outermost mowing unit and movable in a direction parallel with said second frame, said slide means pivotally connected to said second frame, each said gang being vertically flexible and forwardly and rearwardly tiltable to conform to the contour of the ground, and power means associated with said vehicle and said frames including means for pivoting said second frame upwardly toward said first mentioned frame and means actuating said lift mechanism to raise said first frame whereby all of said individual mowing units are raised above the ground.

13. A gang-type grass mower comprising a lift mechanism attached to a vehicle, said lift mechanism comprising guide means rigidly fixed to said vehicle, vertically movable support means mounted on said guide means, a first frame secured horizontally to said movable support means, a support mounted on one end of said first frame having means associated therewith for rolling engagement with a ground surface, a second frame pivoted to said support and directed oppositely from said first frame, said frames disposed at right angles to the direction of movement of said vehicle, a pair of mower gangs each pivoted at one end thereof to said support and extended laterally outwardly therefrom beneath said frames, each said gang comprising a plurality of laterally interhinged, individual mower units, each said gang having wheel means for rolling engagement with said ground surface, lift means connecting each said gang with its respective frame, each gang being vertically flexibly movable to conform to the contour of said ground surface, actuating means connected to said guide means and said movable support means and vertically moving said first frame, and actuating means connected to said movable support means and said second frame and pivoting said second frame upwardly toward said first frame.

14. A gang-type grass mower comprising a lift mechanism attached to a vehicle, said lift mechanism comprising guide means rigidly fixed to said vehicle, vertically movable support means mounted on said guide means, a rectangular frame mounted to said movable support means, said frame positioned in a horizontal plane with the longitudinal dimension thereof disposed at right angles to the direction of travel of said vehicle, a support mounted to one end of said first frame having means associated therewith for rolling engagement with a ground surface, a second rectangular frame longitudinally aligned with said first mentioned frame and pivotally mounted to said support opposite said first frame, said second frame pivotal about an axis disposed parallel to the direction of travel to said vehicle, a first gang of mowers hinged at one end to said support and extending beneath said first mentioned frame and a second gang of mowers hinged at one end to said support and extending beneath said second frame, each said gang comprising a plurality of laterally interhinged mowing units, each said gang having wheel means for rolling engagement with the ground, a plurality of lift rods pivotally secured to said first gang, said lift rods projecting upwardly and slidably mounted to said first mentioned frame, said lift rods having stop means limiting the downward movements thereof, an outermost mowing unit of said second gang being secured to said second frame adjacent an outermost end of said second frame by slide means, said slide means connecting said second frame and said outermost mowing unit by being slidably mounted to one of said elements, and pivotally mounted to the other of said elements, each said gang being vertically flexible to conform to the contour of the ground, actuating means connected to said guide means and said movable support means and vertically moving said first frame, and actuating means connected to said movable support means and said second frame and pivoting said second frame upwardly toward said first frame.

15. A gang-type mower for attaching to one end of a tractor comprising a lift-fork mechanism, said lift-fork mechanism comprising fixed guide means and vertically movable support means movable on said guide means, a pair of forks projecting substantially horizontally from said movable support means, a horizontal frame mounted upon said forks and longitudinally disposed at right angles to the direction of travel of said tractor, a main support secured to one end of said frame, said main support comprising upper and lower relatively pivoted portions, said upper portion fixed to said frame and said lower portion pivotal about an axis parallel with the longitudinal dimension of said frame, a second frame pivoted to said upper portion and directed oppositely from said first mentioned frame, said lower portion of said main support having ground engaging wheels associated therewith, a first gang of mowers hinged at one end to said lower portion of said support and extending beneath said first frame and a second gang of mowers hinged at one end to said lower support and extending beneath said second frame, each said gang comprising a plurality of laterally interhinged mowing units, each said gang having wheel means for rolling engagement with the ground, a plurality of lift rods pivotally secured to said first gang, said lift rods projecting upwardly and slidably mounted to said first frame, said lift rods having stop means limiting the downward movements thereof, an outermost mowing unit of said second gang being secured to said second frame adjacent an outermost end of said second frame by slide means, said slide means slidably mounted to said outermost mowing unit and movable in a direction parallel with said second frame, said slide means pivotally connected to said second frame, each said gang being vertically flexible and forwardly and rearwardly tiltable to conform to the contour of the ground, actuating means connected to said guide means and said movable support means and vertically moving said forks and said first mentioned frame, actuating means connecting said movable support means to said second frame and pivoting said second frame upwardly toward said first frame, and counterbalance means connecting said guide means and said vertically movable support means for partially supporting the weight of said frames.

16. A grass mower for attaching to a vehicle comprising a plurality of individual mower units, each of said units comprising a frame, a source of power, blade means actuated by said power source, said rotary blade means disposed downwardly from said frame and rotating in a plane substantially parallel to said frame, bearing means extending outwardly from portions of the edges of said frame, said bearing means being in the same plane as said blade means, pin means associated with the bearing means of adjacent frames whereby said frames are pivotably mounted relative to each other, said pin means being in the same plane as said blade means, whereby said blade means, upon actuation of said power source, can move in the longitudinal plane through said pin means thereby allowing the blade means of adjacent units to operate within close limits.

References Cited in the file of this patent

UNITED STATES PATENTS

| | | |
|---|---|---|
| 2,682,740 | Miller et al. | July 6, 1954 |
| 2,743,567 | Martin | May 1, 1956 |
| 2,753,674 | Cunningham et al. | July 10, 1956 |
| 2,920,434 | Ingram | Jan. 12, 1960 |